(12) United States Patent
Campbell, Jr. et al.

(10) Patent No.: US 7,393,910 B2
(45) Date of Patent: Jul. 1, 2008

(54) CATALYST COMPOSITION FOR ETHYLENE POLYMERIZATION

(75) Inventors: Richard E. Campbell, Jr., Midland, MI (US); Linfeng Chen, Sugar Land, TX (US); Roger B. Painter, Scott Depot, WV (US); Robert N. Reib, Hurricane, WV (US); Michael W. Tilston, Katy, TX (US)

(73) Assignee: Dow Global Technologies Inc., Midland, MI (US)

( * ) Notice: Subject to any disclaimer, the term of this patent is extended or adjusted under 35 U.S.C. 154(b) by 67 days.

(21) Appl. No.: 10/569,245

(22) PCT Filed: Aug. 18, 2004

(86) PCT No.: PCT/US2004/026641

§ 371 (c)(1),
(2), (4) Date: Feb. 22, 2006

(87) PCT Pub. No.: WO2005/035597

PCT Pub. Date: Apr. 21, 2005

(65) Prior Publication Data

US 2007/0004877 A1      Jan. 4, 2007

Related U.S. Application Data

(60) Provisional application No. 60/505,330, filed on Sep. 23, 2003.

(51) Int. Cl.
*C08F 110/02* (2006.01)

(52) U.S. Cl. .......... 526/352; 526/124.2; 526/124.3; 502/103; 502/115; 502/127

(58) Field of Classification Search .......... 526/352, 526/128, 124.2, 124.3; 502/103, 115, 127
See application file for complete search history.

(56) References Cited

U.S. PATENT DOCUMENTS

| | | | |
|---|---|---|---|
| 3,082,198 A | 3/1963 | Klein | |
| 4,012,574 A | 3/1977 | Jones et al. | |
| 4,107,413 A | 8/1978 | Giannini et al. | |
| 4,115,319 A | 9/1978 | Scata et al. | |
| 4,220,554 A | 9/1980 | Scata et al. | |
| 4,294,721 A | 10/1981 | Cecchin et al. | |
| 4,302,565 A | 11/1981 | Goeke et al. | |
| 4,302,566 A | 11/1981 | Karol et al. | |
| 4,330,649 A | 5/1982 | Kioka et al. | |
| 4,439,540 A | 3/1984 | Cecchin et al. | |
| 4,442,276 A | 4/1984 | Kashiwa et al. | |
| 4,460,701 A | 7/1984 | Terano et al. | |
| 4,472,521 A | 9/1984 | Band | |
| 4,520,163 A * | 5/1985 | Goodall ............... 525/53 | |
| 4,532,311 A | 7/1985 | Fulks et al. | |
| 4,540,679 A | 9/1985 | Arzoumanidis et al. | |
| 4,547,476 A | 10/1985 | Terano et al. | |
| 4,548,915 A | 10/1985 | Goodall et al. | |
| 4,562,173 A | 12/1985 | Terano et al. | |
| 4,728,705 A | 3/1988 | Nestlerode et al. | |
| 4,792,592 A | 12/1988 | Fulks et al. | |
| 4,803,251 A | 2/1989 | Goode et al. | |
| 4,816,433 A | 3/1989 | Terano et al. | |
| 4,829,037 A | 5/1989 | Terano et al. | |
| 4,855,370 A | 8/1989 | Chirillo et al. | |
| 4,876,320 A | 10/1989 | Fulks et al. | |
| 4,927,797 A | 5/1990 | Ewen | |
| 4,942,147 A | 7/1990 | Karol et al. | |
| 4,990,479 A | 2/1991 | Ishimaru et al. | |
| 5,026,795 A | 6/1991 | Hogan | |
| 5,028,671 A | 7/1991 | Kioka et al. | |
| 5,034,361 A | 7/1991 | Job et al. | |
| 5,034,480 A | 7/1991 | Funk et al. | |
| 5,066,736 A | 11/1991 | Dumain et al. | |
| 5,066,737 A * | 11/1991 | Job ................... | 526/119 |
| 5,066,738 A | 11/1991 | Ewen | |
| 5,077,357 A * | 12/1991 | Job ................... | 526/119 |
| 5,082,907 A * | 1/1992 | Job ................... | 526/119 |
| 5,106,806 A | 4/1992 | Job | |
| 5,126,414 A | 6/1992 | Cooke et al. | |

(Continued)

FOREIGN PATENT DOCUMENTS

EP      0 341 723 A2 *   11/1989

(Continued)

OTHER PUBLICATIONS

Database Caplus Online, Chemical Abstracts Service, Columbus, Ohio, US; "Fourth Generation Polymerization Catalysts and Impace-Grade Polypropylene Manufacture Using Them." XP002310160, Retrieved from STN database, Accesion No. 1995:576434 abstract.

*Primary Examiner*—Ling-Siu Choi

(57) ABSTRACT

A process for the polymerization of olefin monomers comprising contacting ethylene or a mixture of ethylene and one or more $C_{4-8}$ α olefins with a catalyst composition comprising one or more Group 3-10 transition metal containing, Ziegler-Natta, procatalyst compounds; one or more alkylaluminum cocatalyts; and one or more polymerization control agents, said process being characterized in that at least one such polymerization control agent is an alkyl or aryl, ester of an aliphatic or aromatic (poly)carboxylic acid optionally containing one or more substituents comprising a Group 13, 14, 15, or 16 heteroatom.

18 Claims, 1 Drawing Sheet

U.S. PATENT DOCUMENTS

| | | | |
|---|---|---|---|
| 5,146,028 A * | 9/1992 | Job | 585/512 |
| 5,151,399 A | 9/1992 | Job | |
| 5,153,158 A | 10/1992 | Kioka et al. | |
| 5,229,342 A | 7/1993 | Job | |
| 5,247,031 A | 9/1993 | Kioka et al. | |
| 5,247,032 A | 9/1993 | Kioka et al. | |
| 5,362,823 A | 11/1994 | Karol et al. | |
| 5,391,657 A | 2/1995 | Song et al. | |
| 5,410,002 A | 4/1995 | Govoni et al. | |
| 5,461,123 A | 10/1995 | Song et al. | |
| 5,610,244 A | 3/1997 | Govoni et al. | |
| 5,627,243 A | 5/1997 | Hamalainen et al. | |
| 6,180,735 B1 | 1/2001 | Wenzel | |
| 2003/0064882 A1 * | 4/2003 | Kitty et al. | 502/103 |

FOREIGN PATENT DOCUMENTS

| | | |
|---|---|---|
| EP | 341723 | 11/1989 |
| EP | 453116 | 10/1991 |
| EP | 475134 | 3/1992 |
| EP | 549252 | 6/1993 |
| JP | 6298832 | 10/1994 |
| WO | WO 96/08520 | 3/1996 |
| WO | WO 96/11961 | 4/1996 |
| WO | WO 97/14721 | 4/1997 |
| WO | WO 97/21476 | 6/1997 |
| WO | WO 97/46599 | 12/1997 |
| WO | WO 00/75203 | 12/2000 |
| WO | WO 02/096558 | 12/2002 |

* cited by examiner

CATALYST COMPOSITION FOR ETHYLENE POLYMERIZATION

CROSS REFERENCE STATEMENT

This application claims the benefit of U.S. Provisional Application No. 60/505,330, filed Sep. 23, 2003.

BACKGROUND OF THE INVENTION

The present invention relates to Ziegler-Natta catalyst compositions for use in the polymerization of ethylene and mixtures of ethylene with one or more $C_{4-8}$ α-olefins having improved high temperature polymerization properties. More particularly, the present invention relates to such catalyst compositions that are self-limiting or auto-extinguishing, thereby avoiding polymer agglomeration, operability problems, and/or reactor sheeting, chunking or fouling due to localized overheating or even "run-away" polymerizations.

Ziegler-Natta catalyst compositions are well known in the art. Typically, these compositions include a Group 3-10 transition metal containing procatalyst compound, especially a complex of titanium-, halide-, and, optionally magnesium-$C_{1-6}$ alkoxide- and/or $C_{6-10}$ aryloxide-moieties; a co-catalyst, usually an organoaluminum compound, especially a trialkylaluminum compound; and a support, preferably finely divided magnesium dichloride. Non-limiting examples of suitable Group 4 metal complexes that are useful as procatalysts include $TiCl_4$, $TiCl_3$, $Ti(OC_2H_5)_3Cl$, $Ti(OC_2H_5)_2Cl_2$, $Ti(OC_2H_5)_3Cl$, $Ti(OC_3H_7)Cl_3$, $Ti(OC_3H_7)_2Cl_2$, $Ti(OC_4H_9)Cl_3$, $Ti(OC_4H_9)_2Cl_2$, $TiCl_3.1/3AlCl_3$, $Ti(OC_{12}H_{25})Cl_3$, $MgTi(OC_2H_5)_5Cl$, $MgTi(OC_2H_5)_4Cl_2$, $MgTi(OC_2H_5)_3Cl_3$, $MgTi(OC_2H_5)_2Cl_4$, $MgTi(OC_2H_5)Cl_5$, and mixtures thereof. Additional suitable components of the Ziegler-Natta catalyst composition may include an internal electron donor, especially $C_{1-6}$ alkyl esters of aromatic carboxylic or dicarboxylic acids; dispersants; surfactants; diluents; inert supports such as silica or alumina; binding agents; and antistatic compounds. Examples of Ziegler-Natta catalyst compositions are shown in U.S. Pat. Nos. 4,107,413; 4,115,319; 4,220,554; 4,294,721; 4,302,565; 4,302,566; 4,330,649; 4,439,540; 4,442,276; 4,460,701; 4,472,521; 4,540,679; 4,547,476; 4,548,915; 4,562,173; 4,728,705; 4,816,433; 4,829,037; 4,927,797; 4,990,479; 5,028,671; 5,034,361; 5,066,737; 5,066,738; 5,077,357; 5,082,907; 5,106,806; 5,146,028; 5,151,399; 5,153,158; 5,229,342; 5,247,031; and 5,247,032.

In a typical continuous gas phase polymerization process, fouling or sheeting can lead to the ineffective operation of various reactor components. For example, accumulation of solid polymer on the surfaces of the reactor, the distributor plate, monitoring sensors, and the recycle system can lead to difficulty in operation and an early reactor shutdown. This problem is often encountered during polymerization of ethylene and ethylene/$C_{4-8}$ α-olefin mixtures since the polymerization reaction is typically conducted at temperatures that are relatively close to the softening temperature or melting point of the resulting polymer.

Reasons for the occurrence of sheeting or fouling and solutions to the various process operability problems caused thereby have been addressed by many in the art. For example, U.S. Pat. Nos. 4,792,592, 4,803,251, 4,855,370 and 5,391,657 all discuss techniques for reducing static generation, and ultimately fouling in a gas phase polymerization process by use of water, alcohols, ketones, and/or inorganic chemical additives. WO 97/14721 discusses the suppression of fines for the same purpose by adding an inert hydrocarbon to the reactor. U.S. Pat. No. 5,627,243 discusses a new type of distributor plate for use in fluidized bed gas phase reactors. WO 96/08520 discusses avoiding the introduction of a scavenger into the reactor. U.S. Pat. No. 5,461,123 discusses using sound waves to reduce sheeting. U.S. Pat. No. 5,066,736 and EP-A1 0 549 252 discuss the introduction of an activity retarder to the reactor to reduce agglomerates. U.S. Pat. No. 5,610,244 relates to feeding make-up monomer directly into the reactor above the bed to avoid fouling and improve polymer quality. U.S. Pat. No. 5,126,414 discusses oligomer removal for reducing distributor plate fouling. U.S. Pat. No. 4,012,574 discusses adding a surface-active compound, such as a perfluorocarbon group, to the reaction mixture. U.S. Pat. Nos. 5,026,795, 5,410,002, 5,034,480, 3,082,198 and EP-A453,116 disclose the addition of various antistatic agents to the polymerization zone in the reactor to reduce fouling, among other reasons.

There are various other known methods for improving reactor operability including coating the polymerization equipment, for example, treating the walls of a reactor using chromium compounds as described in U.S. Pat. Nos. 4,532,311 and 4,876,320, and feeding the catalyst into particle lean regions of the reactor, as discussed in WO 97/46599. Other known methods of reducing fouling include injecting antifoulants or antistatic agents into the reactor; controlling the polymerization rate in the reaction zone; reconfiguring the reactor design; modifying the catalyst system by combining the catalyst components in a particular order; manipulating the ratio of the various catalyst components; prepolymerizing a portion of the monomer; and varying the contact time and/or temperature when combining the components of a catalyst composition. Examples of the foregoing techniques include: WO 96/11961 (use of an antistatic agent); U.S. Pat. No. 5,283,218 (prepolymerization); and U.S. Pat. No. 4,942,147 and 5,362,823 (addition of autoacceleration inhibitors). With respect to the latter two patents, suitable autoacceleration inhibitors were stated to be Diels-Alder adducts that decomposed at elevated temperatures thereby generating a poison for the catalyst composition, exemplified by vanadium based catalysts. In U.S. Pat. No. 6,180,735, the use of solid carbonyl compounds, including aromatic carboxylic acid esters (col. 18, line 57) as one component of a catalyst composition for olefin polymerization was disclosed.

While all these possible solutions might reduce the level of fouling or sheeting of a gas phase polymerization somewhat, some are expensive to employ, some require the addition of undesirable foreign materials into the reactor, some require constant monitoring by an operator and additions in amounts and at times that must be determined empirically, and some may not reduce fouling or sheeting adequately or quickly enough for commercial purposes.

Thus, it would be advantageous to have a gas-phase polymerization process capable of operating continuously with enhanced reactor operability. In particular, the industry still desires a continuously operating, gas phase, Ziegler-Natta catalyzed, olefin polymerization process having reduced fouling or sheeting tendency, and increased duration of operation.

In particular, there remains a need in the art to provide an olefin polymerization process using a Ziegler-Natta catalyst composition for the polymerization of ethylene or mixtures of ethylene with one or more $C_{4-8}$ α-olefins, which process has improved, self-limiting or auto-extinguishing properties, resulting in effectively reduced catalytic activity and heat generation, especially at elevated reaction temperatures. Desirably, the reduction in polymerization activity is inherent in the catalyst composition and does not require monitoring and outside intervention by an operator. In addition, there remains a need in the art to provide an additive or component (polymerization control agent or PCA) for use in combination with an olefin polymerization catalyst composition that is able to result in the foregoing improved, self-limiting, polymerization process.

SUMMARY OF THE INVENTION

The present invention provides an olefin polymerization process which comprises contacting ethylene or a mixture of ethylene and one or more $C_{4-8}$ α-olefins with a catalyst composition comprising one or more Group 3-10 transition metal containing, Ziegler-Natta, procatalyst compounds; one or more alkylaluminum cocatalysts; and one or more polymerization control agents, said process being characterized in that at least one such polymerization control agent is an alkyl or aryl ester of an aliphatic or aromatic (poly)carboxylic acid optionally containing one or more substituents comprising a Group 13, 14, 15, or 16 heteroatom.

The polymerization may be conducted in a single reactor or in two or more reactors connected in series or in parallel. The process is characterized by reduced sheeting or fouling, and increased duration of operation, especially at elevated polymerization temperatures. The improvement in operation is believed to be due to the presence of the polymerization control agent. It is believed, without wishing to be bound by such belief, that the method of operation involves a polymerization-suppressing reaction, between the PCA and the cocatalyst or with the procatalyst to stop polymerization reaction, especially at elevated temperatures greater than 100° C., more preferably greater than 110° C., thereby causing a decrease in polymerization activity. The decrease in polymerization activity results in reduced generation of heat from the exothermic polymerization reaction. Reduction in heat generation serves to control localized temperature excursions thereby preventing sheeting and chunking. At normal polymerization temperatures, the effect on catalyst activity is negligible. Therefore, use of a polymerization control agent according to the present invention does not significantly alter productivity or polymer properties.

DETAILED DESCRIPTION

Figure 1:
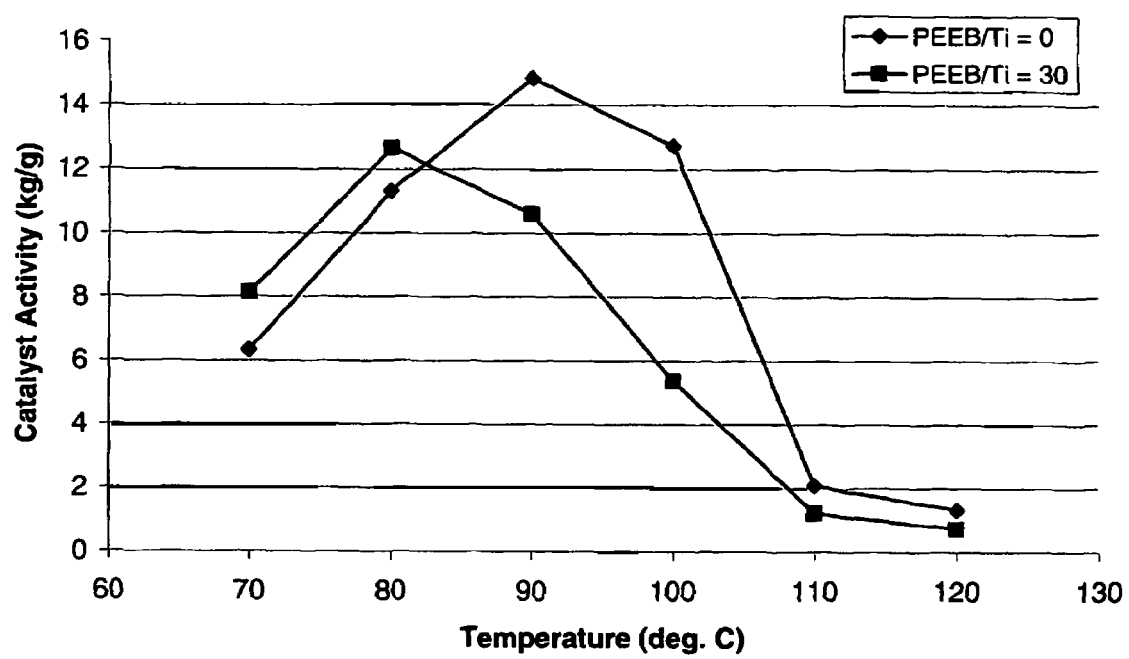
FIG. 1 is a plot of the activity of the catalyst compositions of Example 1 as a function of temperature.

All reference to the Periodic Table of the Elements herein shall refer to the Periodic Table of the Elements, published and copyrighted by CRC Press, Inc., 2001. Also, any reference to a Group or Groups shall be to the Group or Groups as reflected in this Periodic Table of the Elements using the IUPAC system for numbering groups. For purposes of United States patent practice, the contents of any patent, patent application or publication referenced herein are hereby incorporated by reference in their entirety herein, especially with respect to the disclosure of structures, synthetic techniques, or general knowledge in the art.

If appearing herein, the term "comprising" and derivatives thereof is not intended to exclude the presence of any additional component, step or procedure, whether or not the same is disclosed herein. In order to avoid any doubt, all compositions claimed herein through use of the term "comprising" may include any additional additive, adjuvant, or compound, unless stated to the contrary. In contrast, the term, "consisting essentially of" if appearing herein, excludes from the scope of any succeeding recitation any other component, step or procedure, excepting those that are not essential to operability. The term "consisting of", if used, excludes any component, step or procedure not specifically delineated or listed. The term "or", unless stated otherwise or clear from the context, refers to the listed members individually as well as in any combination. The term "inert" means the substance or substituent is substantially non-interfering with any desired reaction or result disclosed herein.

The term "mixture" when used with respect to PCA's, means the use of two or more PCA compounds simultaneously at some time during a polymerization process. The individual PCA's may be added separately to the reactor in any order and over any time interval, or premixed, or used in the form of dilute hydrocarbon solutions thereof. In addition, other components of the polymerization mixture, including the procatalyst, may be combined with one or more of the PCA's of the mixture, and optionally prepolymerized, prior to addition to the reactor.

Ziegler-Natta catalyst compositions for use herein comprise a Group 3-10 transition metal containing procatalyst compound, especially a complex of titanium-, halide-, and, optionally, magnesium-, $C_{1-6}$ alkoxide- and/or $C_{6-10}$ aryloxide-moieties; a co-catalyst, usually an organoaluminum compound, especially a trialkylaluminum compound; and a support, preferably finely divided magnesium dichloride. Non-limiting examples of suitable titanium complexes that are useful as procatalysts include: $TiCl_4$, $TiCl_3$, $Ti(OC_2H_5)_3Cl$, $Ti(OC_2H_5)_2$, $Ti(OC_2H_5)_3Cl$, $Ti(OC_3H_7)Cl_3$, $Ti(OC_3H_7)_2Cl_2$, $Ti(OC_4H_9)Cl_3$, $Ti(OC_4H_9)_2Cl_2$, $TiCl_3.1/3AlCl_3$, $Ti(OC_{12}H_{25})Cl_3$, $MgTi(OC_2H_5)_5Cl_1$, $MgTi(OC_2H_5)_4Cl_2$, $MgTi(OC_2H_5)_3Cl_3$, $MgTi(OC_2H_5)_2Cl_4$, $MgTi(OC_2H_5)Cl_5$, $MgCl_2.TiCl_4$, $MgTiCl_6.4(CH_3C(O)OC_2H_5)$, $MgTiCl_5(CH_3COOC_2H_5)_2$, $Mg_3Ti_2Cl_{12}(CH_3COOC_2H_5)_7$, $MgTiCl_5(C_2H_5OH)_6$, $MgTiCl_5(CH_3OH)_{10}$, $MgTiCl_5(THF)$, $MgTi_2Cl_{12}(C_6H_5CN)_7$, $Mg_3Ti_2Cl_{12}.6(C_6H_5COOC_2H_5)$, $MgTiCl_6.2(CH_3COOC_2H_5)$, $MgTiCl_6.6(C_5H_5N)$, $MgTiCl_5(OCH_3).2(CH_3COOC_2H_5)$, $MgTiCl_5N(C_6H_5)_2$ $3(CH_3COOC_2H_5)$, $MgTiBr_2Cl_4.2(C_2H_5)_2O)$, $MnTiCl_5.4(C_2H_5OH)$, $Mg_3V_2Cl_{12}.7(CH_3COOC_2H_5)$, $MgZrCl_6.4(THF)$, and mixtures thereof.

Additional suitable transition metal compounds include vanadium compounds such as vanadyl trihalide, vanadyl $C_{1-10}$ hydrocarbyloxyhalides, and vanadyl $C_{1-10}$ hydrocarbyloxides such as $VOCl_3$, $VOCl_2(OR^*)$, and $VO(OR^*)_3$; vanadium tetrahalide and vanadium $C_{1-10}$ hydrocarbyl oxyhalides such as $VCl_4$ and $VCl_3(OR^*)$; as well as vanadium- and vanadyl-acetylacetonates and chloroacetylacetonates, such as $V(AcAc)_3$ and $VOCl_2(AcAc)$, where $R^*$ is $C_{1-10}$ hydrocarbyl, preferably an aliphatic, cycloaliphatic, or aromatic hydrocarbon radical, such as ethyl, n-propyl, isopropyl, n-butyl, isobutyl, tertiary-butyl, n-hexyl, cyclohexyl, phenyl, or naphthyl, and (AcAc) is acetylacetonate. Preferred vanadium catalyst compounds are $VOCl_3$, $VCl_4$, and $VOCl_2(OC_4H_9)$.

Additional suitable transition metal compounds include chromium compounds such as $CrO_3$, chromocene, silyl chromate, chromyl chloride ($CrO_2Cl_2$), chromium-2-ethyl-hexanoate, and chromium triacetylacetonate. Non-limiting examples of chromium compounds suitable for use herein are disclosed in U.S. Pat. Nos. 3,709,853, 3,709,954, 3,231,550, 3,242,099 and 4,077,904.

Additional suitable components of the Ziegler-Natta catalyst composition include an internal electron donor, especially a $C_{1-6}$ alkyl ester of an aromatic carboxylic or dicarboxylic acid; dispersants; surfactants; diluents; inert supports; binding agents; and antistatic compounds. A preferred procatalyst is $TiCl_4$ supported on $MgCl_2$.

Preferred polymerization control agents for use herein include at least one compound selected from the group consisting of alkyl or aryl esters of an aliphatic or aromatic (poly)carboxylic acid containing one or more substituents comprising a Group 13, 14, 15, or 16 heteroatom and having up to 50 atoms not counting hydrogen. Highly preferred PCA's include $C_{1-10}$ alkyl monoether derivatives of $C_{1-10}$ alkyl esters of benzoic acid, $C_{1-10}$ alkyl mono ether derivatives of $C_{1-10}$ dialkyl esters of phthalic acid, and $C_{1-10}$ alkyl monoether derivatives of $C_{1-10}$ dialkyl esters of terephthalic acid. More highly preferred PCA's include group consisting of $C_{1-4}$ alcyl monoether derivatives of $C_{1-4}$ alkyl esters of benzoic acid, $C_{1-4}$ alkyl monoether derivatives of $C_{1-4}$ dialkyl esters of phthalic acid, and $C_{1-4}$ alkyl monoether derivatives of $C_{1-4}$ dialkyl esters of terephthalic acid. A most preferred PCA is ethyl p-ethoxybenzoate (PEEB).

The benefits of the invention are obtained by operation in a wide range of procatalyst transition metal:PCA molar ratios. Preferably, such molar ratios are from 1:0.1 to 1:500, more preferably from 1:1 to 1:50. Suitable molar ratios of PCA: cocatalyst are from 1:0.01 to 1:1000, more preferably from 1:1 to 1:100. The benefits of the invention are also applicable to mixtures of two or more PCA's, if desired. Generally, the PCA's become active at polymerization temperatures greater than 80° C., more preferably at polymerization temperatures greater than 85° C.

The Ziegler-Natta, transition metal catalyst composition may also include an inert support material, if desired. The support should be a particulated, inert solid that does not adversely alter the catalytic performance of the catalyst. Examples include metal oxides, such as alumina, and metalloid oxides, such as silica.

Cocatalysts for use with the foregoing transition metal, Ziegler-Natta catalyst compositions according to the invention include organoaluminum compounds, such as alkylaluminum dihalide-, trialkoxyaluminum-, dialkylaluminum halide-, and trialkylaluminum-compounds containing from 1-10 carbon atoms in each alkyl- or alkoxy-group. Preferred cocatalytsts are $C_{1-4}$ trialkylaluminum compounds, especially triethylaluminum (TEA) and triisobutylaluminum (TIBA).

One suitable method of practicing a polymerization process according to the present invention comprises performing the following steps in any order or in any combination or subcombination of individual steps:

a) providing a transition metal containing Ziegler-Natta procatalyst composition to a polymerization reactor;
b) providing an organoaluminum cocatalyst compound to the polymerization reactor;
c) providing one or more PCA's meeting the foregoing requirements to the polymerization reactor;
d) providing ethylene or a mixture of ethylene and one or more $C_{4-8}$ α-olefins to the reactor; and
e) extracting a polymer product from the reactor.

Another suitable method of practicing a polymerization process according to the present invention comprises performing the following steps in any order or in any combination or subcombination of individual steps:

a) providing a transition metal containing Ziegler-Natta procatalyst composition comprising one or more PCA's meeting the foregoing requirements to a polymerization reactor;
b) providing an organoaluminum cocatalyst compound to the polymerization reactor;
c) providing ethylene or a mixture of ethylene and one or more $C_{4-8}$ α-olefins to the reactor; and
d) extracting a polymer product from the reactor.

Preferred polymerization processes in which the present invention is particularly suited are gas phase polymerization processes. The polymerization may be conducted in a single reactor or in multiple reactors operating in parallel or in series. In a multiple reactor polymerization, at least one of the reactors is desirably a gas-phase polymerization reactor. Suitable gas phase polymerization processes include the use of condensing mode as well as super condensing mode wherein condensed gaseous components, optionally including inert low boiling compounds (super condensing mode), are injected into the reactor in liquid form for purposes of heat removal. When multiple reactors are employed, it is desirable that they operate in series, that is, the effluent from the first reactor is desirably charged to the second reactor and additional monomer or different monomer added to continue polymerization. Additional catalyst or catalyst components (that is procatalyst, cocatalyst and PCA) may be added, if desired, to any or all of the reactors. Highly desirably, the PCA is added to only the first reactor of the series, and is effective in controlling the polymerization kinetics of at least the next reactor in the series. Highly desirably, one or all reactors are operated at a polymerization temperature greater than 80° C., more preferably at a polymerization temperature greater than 85° C.

It is expressly intended that the foregoing disclosure of preferred, more preferred, highly preferred, or most preferred substituents, ranges, components or combinations with respect to any one of the embodiments of the invention is applicable as well to any other of the preceding or succeeding embodiments independently of the identity of any other specific substituent, range, component, or combination.

The following embodiments are provided as specific enablement for the appended claims.

1. A process for the polymerization of olefin monomers comprising contacting ethylene or a mixture of ethylene and one or more $C_{4-8}$ α-olefins with a catalyst composition comprising one or more Group 3-10 transition metal containing, Ziegler-Natta, procatalyst compounds; one or more alkylaluminum cocatalysts; and one or more polymerization control agents, said process being characterized in that at least one such polymerization control agent is an alkyl or aryl ester of an aliphatic or aromatic (poly)carboxylic acid optionally containing one or more substituents comprising a Group 13, 14, 15, or 16 heteroatom.

2. A process according to embodiment 1 wherein the Ziegler-Natta procatalyst is selected from the group consisting of: $TiCl_4$, $TiCl_3$, $Ti(OC_2H_5)_3Cl$, $Ti(OC_2H_5)_2Cl_2$, $Ti(OC_2H_5)_3Cl$, $Ti(OC_3H_7)Cl_3$, $Ti(OC_3H_7)_2Cl_2$, $Ti(OC_4H_9)Cl_3$, $Ti(OC_4H_9)_2Cl_2$, $TiCl_3.1/3AlCl_3$, $Ti(OC_{12}H_{25})Cl_3$, $MgTi(OC_2H_5)_5Cl_1$, $MgTi(OC_2H_5)_4Cl_2$, $MgTi(OC_2H_5)_3Cl_3$, $MgTi(OC_2H_5)_2Cl_4$, $MgTi(OC_2H_5)Cl_5$, $MgCl_2.TiCl_4$, and mixtures thereof.

3. A process according to embodiment 1 wherein the Ziegler-Natta procatalyst compound is $TiCl_4$ or $TiCl_3$ supported on $MgCl_2$.

4. A process according to embodiment 1 wherein the cocatalyst is a trialkylaluminum compound.

5. A process according to embodiment 4 wherein the cocatalyst is triisobutylaluminum or triethylaluminum.

6. A process according to embodiment 1 which is a continuous, gas phase polymerization process.

7. A process according to embodiment 1 which is conducted in more than one reactor operating in series.

8. The process of embodiment 7 wherein the catalyst composition is added to only the first reactor of the series.

9. The process of embodiment 8 in which two reactors are used.

10. A process according to embodiment 6 which is conducted in more than one reactor operating in series.

11. The process of embodiment 10 wherein the catalyst composition is added to only the first reactor of the series.

12. The process of embodiment 11 in which two reactors are used.

13. A process according to any one of embodiments 1-12 wherein the polymerization control agent is a single compound selected from the group consisting of alkyl or aryl esters of aliphatic or aromatic (poly)carboxylic acids containing one or more substituents comprising a Group 13, 14, 15, or 16 heteroatom having up to 50 atoms not counting hydrogen.

14. A process according to embodiment 13 wherein the polymerization control agent is selected from the group consisting of $C_{1-10}$ alkyl monoether derivatives of $C_{1-10}$ alkyl esters of benzoic acid, $C_{1-10}$ alkyl monoether derivatives of $C_{1-10}$ dialkyl esters of phthalic acid, and $C_{1-10}$ alkyl monoether derivatives of $C_{1-10}$ dialkyl esters of terephthalic acid.

15. A process according to embodiment 13 wherein the polymerization control agent is ethyl p-ethoxybenzoate.

The invention is further illustrated by the following examples that should not be regarded as limiting of the present invention. Unless stated to the contrary or conventional in the art, all parts and percents herein are based on weight.

EXAMPLE 1

Ethylene polymerizations are carried out in a 48 cell automated, combinatorial multireactor (available from Symyx Technologies, Inc., and operated substantially according to U.S. Pat. No. 6,306,658). All solvents are dried prior to use. Reactor conditions employed are an initial charge of 70 kPa (10 psig) $H_2$ with ethylene supplied continuously during the polymerization to provide a total reactor pressure of 0.7 MPa (100 psig). A standard $MgCl_2$ supported titanium containing Ziegler-Natta protocatalyst composition prepared substantially according to the teachings of U.S. Pat. Nos. 6,248,831, 5,290,745, 4,376,062 and 4,293,673 is employed.

Standard reactions without a PCA are: 157 μl of a 0.05M solution of triisobutylaluminum (TIBA) in mixed alkanes solvent (Isopar E™, available from Exxon Chemicals Inc.) in an amount to provide Al/Ti molar ratio of 500/1, 5205 μl of mixed alkanes, 138 μl (0.248 mg/ml) of a mixed alkanes slurry of the procatalyst, followed by a rinse of 500 μl of mixed alkanes.

Reactions with a PCA (PEEB) are: 157 μl of a 0.05M solution of triisobutylaluminum (TIBA) in mixed alkanes (calculated to provide an Al/Ti molar ratio of 500/1), 4516 μl of mixed alkanes, 189 μl of a 0.0025 M solution of PEEB in mixed alkanes (calculated to give a PCA/Ti ratio of 30/1) followed by 500 μl of mixed alkanes, and 138 μl (0.248 mg/ml) of a mixed alkanes slurry of the procatalyst, followed by 500 μl of mixed alkanes.

Polymerization is terminated by addition of $CO_2$ at the end of 3600 seconds or upon sensing a present ethylene flow limit of approximately 150 percent of initial charge. Upon completion of polymerization, the reactors are vented to ambient pressure; the glass vials containing polymer are removed and devolatilized in a rotary evaporator at 25° C. for 16 hours. The polymer yields are determined by difference from the weights of the glass inserts before and after polymerization and devolatilization. Average results of two or three polymerizations are reported in Table 1 and depicted graphically in FIG. 1.

TABLE 1

| Run | PEEB/Ti (mol/mol) | Temp. (° C.) | Average Activity (kg/g procatalyst) |
|---|---|---|---|
| 1* | 0/1 | 70 | 6.33 |
| 2* | 0/1 | 80 | 11.32 |
| 3* | 0/1 | 90 | 14.83 |
| 4* | 0/1 | 100 | 12.73 |
| 5* | 0/1 | 110 | 2.09 |
| 6* | 0/1 | 120 | 1.33 |
| 7 | 30/1 | 70 | 8.14 |
| 8 | 30/1 | 80 | 12.65 |
| 9 | 30/1 | 90 | 10.60 |
| 10 | 30/1 | 100 | 5.38 |
| 11 | 30/1 | 110 | 1.22 |
| 12 | 30/1 | 120 | 0.74 |

*Comparative, not an example of the invention

When the polymerization is conducted without a PCA, catalyst activity increases until about 90° C. and decays at temperatures above about 100° C. With a PCA, the catalyst starts decaying at lower temperatures closer to 80° C. At 100° C., and especially at 110° C., the activity of the catalyst composition containing a PCA is significantly less than the activity of the catalyst composition lacking a PCA. The amount of heat generated from the exothermic polymerization reaction, especially at temperatures close to the polymer's softening point, is believed to contribute to polymer agglomeration and reactor continuity problems, such as sheeting, chunking, and fouling. Suppressing the catalyst activity at these higher temperatures can significantly reduce the heat generated, thus reducing the chance of agglomerate formation and reactor continuity problems.

The invention claimed is:

1. A process for polymerizing an olefin monomer comprising:
   (i) contacting, in a reactor, the olefin monomer, the olefin monomer consisting of ethylene, with a catalyst composition comprising one or more Group 3-10 transition metal containing Ziegler-Natta procatalyst compounds; and one or more alkylaluminum cocatalysts;
   (ii) providing to the reactor one or more polymerization control agents, wherein at least one such polymerization control agent is an alkyl or aryl ester of an aliphatic or aromatic (poly)carboxylic acid optionally containing one or more substituents comprising a Group 13, 14, 15, or 16 heteroatom and the polymerization control agents is or are provided at a polymerization to co-catalyst ratio from 1:1 to 1:100 such that the polymerization control agent stops the polymerization reaction at a temperature greater than 100° C.;
   (iii) gas phase polymerizing at a reactor temperature of greater than 80° C. to form a polymer; and
   (iv) extracting the polymer from the reactor.

2. A process according to claim 1 wherein the Ziegler-Natta procatalyst is selected from the group consisting of: $TiCl_4$, $TiCl_3$, $Ti(OC_2H_5)_3Cl$, $Ti(OC_2H_5)_2Cl_2$, $Ti(OC_2H_5)_3Cl$, $Ti(OC_3H_7)Cl_3$, $Ti(OC_3H_7)_2Cl_2$, $Ti(OC_4H_9)Cl_3$, $Ti(OC_4H_9)_2Cl_2$, $TiCl_3 \cdot 1/3AlCl_3$, $Ti(OC_{12}H_{25})Cl_3$, $MgTi(OC_2H_5)_5Cl_1$, $MgTi(OC_2H_5)_4Cl_2$, $MgTi(OC_2H_5)_3Cl_3$, $MgTi(OC_2H_5)_2Cl_4$, $MgTi(OC_2H_5)Cl_5$, $MgCl_2 \cdot TiCl_4$, and mixtures thereof.

3. A process according to claim 1 wherein the Ziegler-Natta procatalyst compound is $TiCl_4$ or $TiCl_3$ supported on $MgCl_2$.

4. A process according to claim 1 wherein the cocatalyst is a trialkylaluminum compound.

5. A process according to claim 4 wherein the cocatalyst is triisobutylaluminum or triethylaluminum.

6. A process according to claim 1 which is a continuous, gas phase polymerization process.

7. A process according to claim 1 which is conducted in more than one reactor operating in series.

8. A process of claim 7 wherein the catalyst composition is added to only the first reactor of the series.

9. A process of claim 8 in which two reactors are used.

10. A process according to claim 6 which is conducted in more than one reactor operating in series.

11. A process of claim 10 wherein the catalyst composition is added to only the first reactor of the series.

12. A process of claim 11 in which two reactors are used.

13. A process according to any one of claims 1-12 wherein the polymerization control agent is a single compound selected from the group consisting of alkyl or aryl esters of aliphatic or aromatic (poly)carboxylic acids containing one or more substituents comprising a Group 13, 14, 15, or 16 heteroatom having up to 50 atoms not counting hydrogen.

14. A process according to claim 13 wherein the polymerization control agent is selected from the group consisting of $C_{1-10}$ alkyl monoether derivatives of $C_{1-10}$ alkyl esters of benzoic acid, $C_{1-10}$ alkyl monoether derivatives of $C_{1-10}$ dialkyl esters of phthalic acid, and $C_{1-10}$ alkyl monoether derivatives of $C_{1-10}$ dialkyl esters of terephthalic acid.

15. A process according to claim 13 wherein the polymerization control agent is ethyl p-ethoxybenzoate.

16. A process of claim 1, wherein the operating temperature of the reactor is greater than 85° C.

17. A process of claim 1, wherein the temperature where the polymerization control agent stops the polymerization reaction is greater than 110° C.

18. A process of claim 1, wherein the polymerization control agent is separately added to the reactor.

* * * * *